C. W. HODGES.
TIRE CHAIN.
APPLICATION FILED JUNE 26, 1916.
1,229,613.
Patented June 12, 1917.
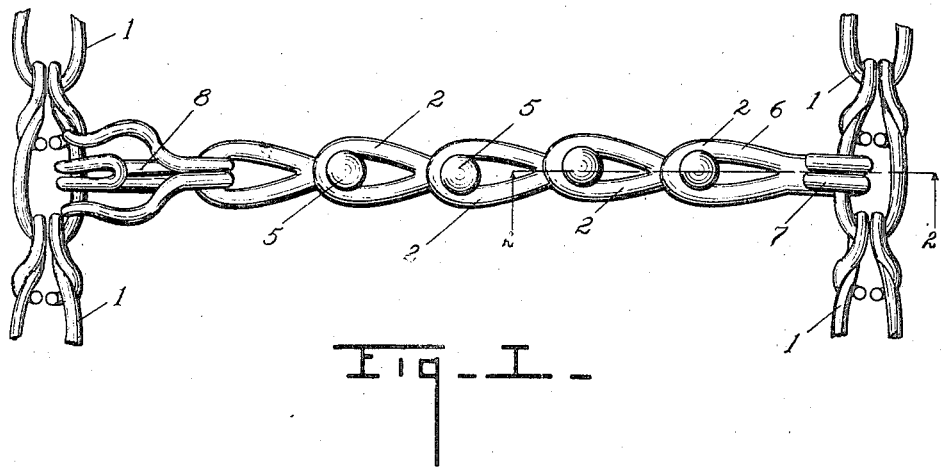
Fig. I.
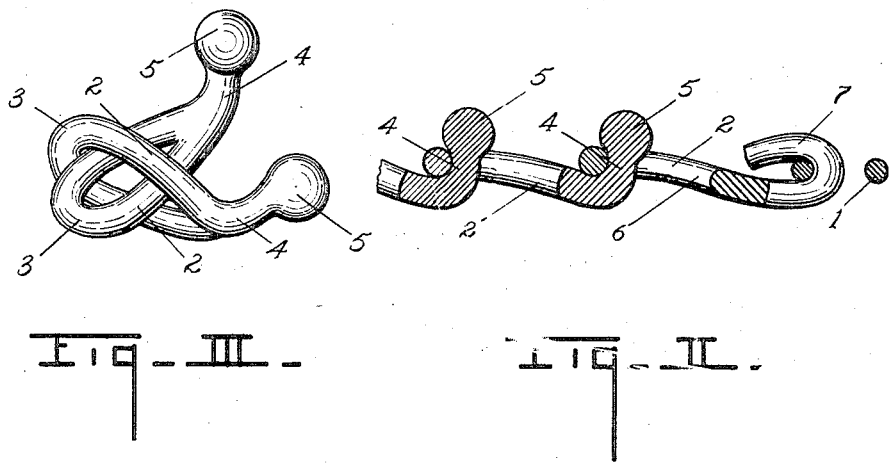
Fig. III.    Fig. II.
WITNESSES:
INVENTOR.
Chauncey W. Hodges
BY
ATTORNEYS.

UNITED STATES PATENT OFFICE.

CHAUNCEY W. HODGES, OF GRAND RAPIDS, MICHIGAN.

TIRE-CHAIN.

1,229,613.  Specification of Letters Patent.  Patented June 12, 1917.

Application filed June 26, 1916. Serial No. 105,909.

*To all whom it may concern:*

Be it known that I, CHAUNCEY W. HODGES, a citizen of the United States, residing at Grand Rapids, county of Kent, State of Michigan, have invented certain new and useful Improvements in Tire-Chains, of which the following is a specification.

This invention relates to improvements in tire chains.

The main objects of this invention are:

First, to provide an improved tire chain which is very effective as an anti slip device.

Second, to provide an improved tire chain having effective tread portions which may be case hardened and are adapted to receive the main tread and traction wear.

Third, to provide a chain in which the links may be effectively separated or joined.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention, only one of the cross members and only sections of the side members being shown.

Fig. II is an enlarged detail section on a line corresponding to line 2—2 of Fig. I.

Fig. III is a perspective view showing the method of connecting and disconnecting.

In the drawing similar reference numerals refer to similar parts throughout the several views.

Referring to the drawing, 1 represents the side members of an anti skid chain for vehicle wheels, the cross chains, only one of which is illustrated, comprise links 2 having loops 3 at one end and laterally projecting neck portions 4 at the other terminating in heads 5.

The loops 3 are of such size that the links may be joined by inserting the loop of one link through the loop of a coacting link, as shown in Fig. III, the heads 5 being of such size as to prevent their passing through the loops when the necks 4 are engaged therewith, as shown in detail in Fig. II. These heads 5 are preferably spherical, as illustrated, and when the chain is designed as a cross member for anti skid chains the heads are preferably case hardened so as to increase their wearing quality.

The body portions of the links are preferably not case hardened as that increases the liability of breakage. The spherical heads 5 provide a series of knob-like projections for the cross chains and constitute effective tread and traction members.

By forming the links in this manner they may be readily connected or disconnected in assembling the chains or to permit the renewal of worn or broken links. The link 6 at one end of the cross members is provided with a hook 7 engaged in one of the links of one side member 1. At the other end I preferably provide the cross member with a hook link 8 which is that illustrated and described in my application for Letters Patent, filed March 25, 1916, Ser. No. 86,715.

Chains embodying the feature of my invention are simple and economical to produce, effective and durable in use, and also have the advantage of being readily repaired should occasion require.

Having thus described my invention, what I claim as new and desire to secure by Letters Patent, is:

1. In a tire chain, the combination of a pair of side members and cross members connected thereto comprising links having loops at one end and laterally projecting neck portions at the other engaging the loops of the adjacent links and terminating in spherical heads of such size as to prevent their passing through the loops, said heads being case hardened and constituting tread members, the links being engaged and disengaged by passing their loop ends through the loops of coacting links.

2. In a tire chain, the combination of a pair of side members and cross members connected thereto comprising links having loops at one end and laterally projecting neck portions at the other engaging the loops of the adjacent links and terminating in heads of such size as to prevent their passing through the loops, the links being engaged and disengaged by passing their loop ends through the loops of coacting links.

3. In a tire chain, the combination of a pair of side members and cross members connected thereto comprising links having loops at one end and laterally projecting neck portions at the other engaging the loops of the adjacent links and terminating in heads of such size as to prevent their passing through the loops, said heads constituting tread members.

4. A chain comprising links having loops at one end and laterally projecting neck portions at the other engaging the loops of the adjacent links and terminating in heads of such size as to prevent their passing through the loops, said heads being case hardened, the links being engaged and disengaged by passing their loop ends through the loops of coacting links.

5. A chain comprising links having loops at one end and laterally projecting neck portions at the other engaging the loops of the adjacent links and terminating in heads of such size as to prevent their passing through the loops, said heads being case hardened.

6. A chain comprising links having loops at one end and laterally projecting neck portions at the other engaging the loops of the adjacent links and terminating in heads of such size as to prevent their passing through the loops, the links being engaged and disengaged by passing their loop ends through the loops of coacting links.

In witness whereof, I have hereunto set my hand and seal in the presence of two witnesses.

CHAUNCEY W. HODGES. [L. S.]

Witnesses:
 GEORGE B. KINGSTON,
 FRANCIS L. WILLIAMS.